US012587737B2

(12) United States Patent
Daurio et al.

(10) Patent No.: US 12,587,737 B2
(45) Date of Patent: Mar. 24, 2026

(54) PRODUCTION RESOURCE OBJECT MANAGER

(71) Applicant: NBCUNIVERSAL MEDIA, LLC, Universal City, CA (US)

(72) Inventors: Steven Daurio, Cliffwood, NJ (US); Jason Sturgill, Springfield, NJ (US); Michael Baek, New York, NY (US); Robert Dayrit, Nutley, NJ (US); Robert Barton, Buchanan, NY (US); Tanya McFarland, Wantagh, NY (US); Andrew Burnheimer, Brooklyn, NY (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 243 days.

(21) Appl. No.: 18/486,932

(22) Filed: Oct. 13, 2023

(65) Prior Publication Data

US 2025/0126356 A1     Apr. 17, 2025

(51) Int. Cl.
*H04N 23/60*     (2023.01)
*H04N 23/65*     (2023.01)
*H04N 23/66*     (2023.01)
*H04N 23/661*     (2023.01)

(52) U.S. Cl.
CPC ................................. *H04N 23/661* (2023.01)

(58) Field of Classification Search
CPC ...... H04N 23/661; H04W 8/18; H04W 48/18; H04W 12/06
USPC ......................................................... 709/227
See application file for complete search history.

(56) References Cited

U.S. PATENT DOCUMENTS

2018/0160294 A1*   6/2018   Lee ........................ H04W 8/183
2022/0046408 A1*   2/2022   Kang .................... H04L 63/102

* cited by examiner

*Primary Examiner* — Jude Jean Gilles
(74) *Attorney, Agent, or Firm* — LEE, HONG, DEGERMAN, KANG & WAIMEY

(57) ABSTRACT

According to at least one embodiment, a method for providing connectivity between a remote source and a control room is disclosed. The method includes: receiving a request to connect the remote source and the control room; and in response to receiving the request, determining an input/output mapping between the remote source and the control room. The input/output mapping is based on a first profile information associated with the remote source and a second profile information associated with the control room. The method further includes: based on the determined input/output mapping, enabling a connection between the remote source and the control room.

16 Claims, 7 Drawing Sheets

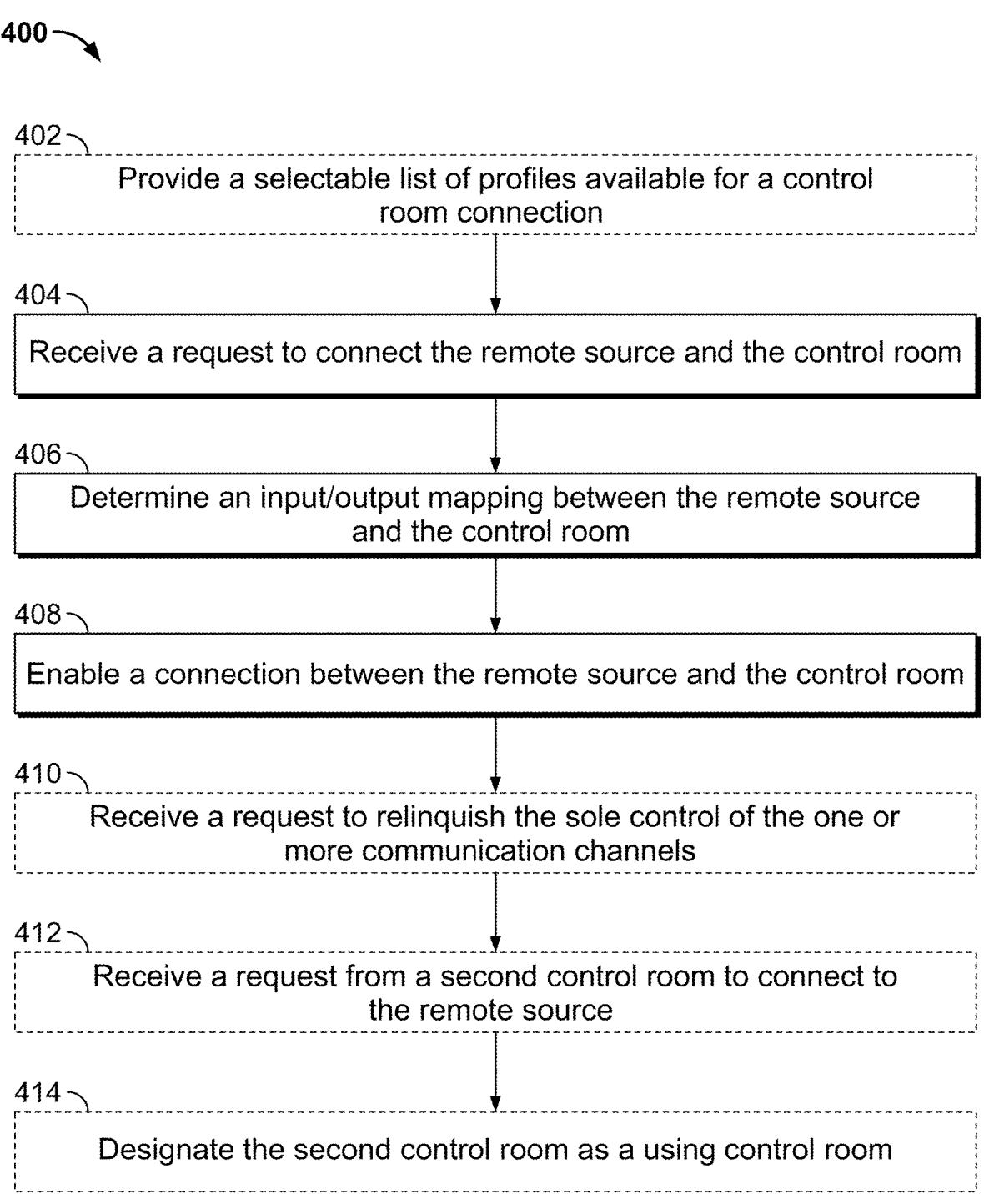

400

402
Provide a selectable list of profiles available for a control room connection 404
Receive a request to connect the remote source and the control room 406
Determine an input/output mapping between the remote source and the control room 408
Enable a connection between the remote source and the control room 410
Receive a request to relinquish the sole control of the one or more communication channels 412
Receive a request from a second control room to connect to the remote source 414
Designate the second control room as a using control room

PRODUCTION RESOURCE OBJECT MANAGER

BACKGROUND

The production of live (or live-to-tape) media content such as a television program or a podcast may require use of a control room (or production control room). The control room may include hardware and/or firmware equipment that is located in physical premises such as a building or a facility.

The control room may utilize live audio and/or video content captured from any of various locations that are located remotely from the control room—e.g., a video conference system, the White House, the scene of a breaking news event, and a set position or studio that is located within a production facility. Content generated at such locations may include not only video and audio signals that are captured, but also communication signals that may be used by various personnel to coordinate and/or support transmitting and/or receiving live content.

A camera position for capturing audio and/or video of an individual (e.g., a correspondent, a guest or a host) that is to be included within a live television program may be referred to as a live shot. Producing such a program may involve interacting with more than one live shots.

The process of setting up multiple live shots for a given control room may be time-consuming and complicated due to the large number of signals and communication channels that need to be aligned with the corresponding inputs and outputs between the live shot and the control room. In addition, it may be difficult to move or transfer a live shot from one control room (e.g., a first control room producing a first television program) to another control room (e.g., a second control room producing a second television program that is different from the first television program). For example, the move or transfer may require that the signals and communication channels be dropped from the first control room and re-established from scratch for the second control room. A need exists to enable a more frictionless process for establishing audio, video, and communication connections between a live source or a remote source and a control room.

SUMMARY

With respect to various embodiments disclosed herein, features and techniques are described for managing and controlling connectivity such that setup and transferability are improved.

According to at least one embodiment, a method for providing connectivity between a remote source and a control room is disclosed. The method includes: receiving a request to connect the remote source and the control room; and in response to receiving the request, determining an input/output mapping between the remote source and the control room. The input/output mapping is based on a first profile information associated with the remote source and a second profile information associated with the control room. The method further includes: based on the determined input/output mapping, enabling a connection between the remote source and the control room.

According to at least one embodiment, a machine-readable non-transitory medium has stored thereon machine-executable code for providing connectivity between a remote source and a control room. The code includes code to: receive a request to connect the remote source and the control room; and in response to receiving the request, determine an input/output mapping between the remote source and the control room. The input/output mapping is based on a first profile information associated with the remote source and a second profile information associated with the control room. The code further includes code to: based on the determined input/output mapping, enable a connection between the remote source and the control room.

According to at least one embodiment, an apparatus for providing connectivity between a remote source and a control room includes: a network communication unit configured to transmit and receive data; and one or more processors. The one or more processors are configured to: receive a request to connect the remote source and the control room; and in response to receiving the request, determine an input/output mapping between the remote source and the control room. The input/output mapping is based on a first profile information associated with the remote source and a second profile information associated with the control room. The one or more processors are further configured to: based on the determined input/output mapping, enable a connection between the remote source and the control room.

BRIEF DESCRIPTION OF THE DRAWINGS

The above and other aspects and features of the present disclosure will become more apparent upon consideration of the following description of embodiments, taken in conjunction with the accompanying drawing figures.

FIG. 4 illustrates a flowchart of a method for providing connectivity between a remote source and a control room according to at least one embodiment.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Figure 1:
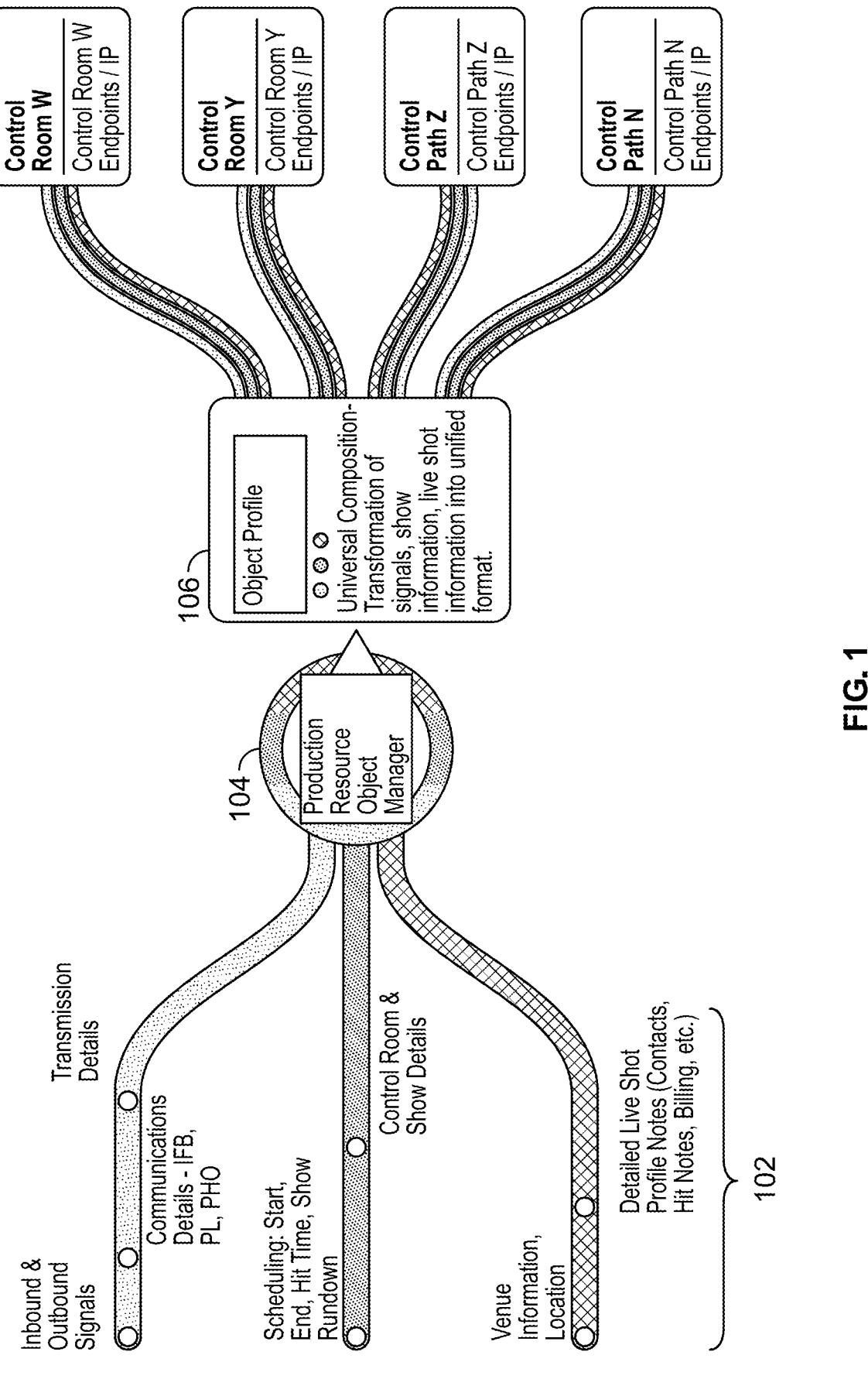
FIG. 1 is a diagram of an example environment in which live (or live-to-tape) media content is produced according to at least one embodiment.

FIG. 1 is a diagram of an example environment in which live (or live-to-tape) media content is produced according to at least one embodiment.

With reference to FIG. 1, information from a live shot 102 is provided to a system, which is referred to as a production resource object manager (PROM). The discussion of PROM in the context of live shots throughout the description is exemplary and for convenience as the PROM may also be deployed and implemented in other contexts like a remote shot, including when sourcing from taped media rather than live media. For example, such information may be provided along an Inbound Path leading from the live shot 102 to the PROM 104. In addition, different information may be provided from the PROM 104 to the live shot 102. For example, such information may be provided along an Outbound Path leading from the PROM 104 to the live shot 102.

The PROM 104 allows users to create, add, and search profiles corresponding to live shots that can then be managed and used by any of various control rooms (e.g., Control Room W, Control Room Y) and/or control paths (e.g., Control Path Z, Control Path N). A control path may be similar to a control room, but may not necessarily include hardware elements associated with a typical control room. For example, the control path may be a virtually configured control endpoint.

To support a new live shot, an object profile 106 is configured by the PROM 104. In at least one aspect, the object profile 106, as configured by the PROM 104, represents the live shot as a composition of signals and/or resources (e.g., source and destination audio/video (A/V) signals/resources such as communications settings, switcher settings, audio board input/output (I/O) settings, etc.).

By default, the object profile 106 may be made available (e.g., for searching by one or more operators) over the span of a single day (e.g., ending at 12 AM Eastern Time or ending within 24 hours of profile creation), known as the PROM Broadcast Day. However, it is understood that the availability duration may be extended further.

Information included in the object profile 106 may include the originating venue/set location and the types of connectivity that are required to receive content from the location, plus information regarding one or more sources of audio and video (e.g., Facility IP router sources). The information may also include information regarding one or more communication channels that enable personnel at the control room and personnel at the live shot location to communicate, and that enable the latter to listen to/monitor the output of the control room (e.g., a program or show).

The information in the object profile 106 may include a start time, an end time, and a "hit" time that are scheduled for the program or show. The start time and the end time indicate when the details associated within the object profile 106 are valid and protected, and may be used to drive logic that manages the pooled communications and video conference system resources. The "hit" time indicates a time at which the live shot is needed, or when a live shot should be active in (e.g., or is scheduled to begin within) the program or show. For example, a "hit" time may refer to a time that is 10 minutes (or another threshold of time) before a press conference corresponding to the live shot is scheduled to begin.

The information may also include a show rundown, which is an item-by-item sequence of events that will happen within the program or show. The information may also include information regarding a talent/reporter/host and logistical details and notes about live shot locations/venues, along with integration-related information regarding production systems (e.g., customization labels for production communications channels and production video monitoring).

The information may also include communications details regarding control and input of programming of studio and remote talent communications devices, e.g., interruptible foldback (IFB) which regards landline telephone production resource(s) for remote talent to hear the program, party line (PL) which regards landline telephone production resource(s) for communication between the control room and the remote location, and phoner (PHO) which regards landline telephone production resource(s) for remote talent on-air reporting, dialogue or interview.

The information may also include one or more of the following:

Transmission (Tx)—An assigned route in a given system that is used to identify routing and/or system details to allow further programming of a live shot;

Venue—The originating location or means of distribution for a live shot—e.g., a local studio location, reporter locations with permanent connectivity, specific satellite vehicles, video conference connection with talent;

Venue Type—Categorization of venues to distinguish the need to input certain live shot information in the PROM address book based upon the type, such as video conference, remote fixed location, truck, or remote vendor studio; and/or Profile Notes—Any miscellaneous information used for booking or scheduling a live shot—contact details, hit notes (specific instructions during a live shot), billing details, etc.

Figure 2A:
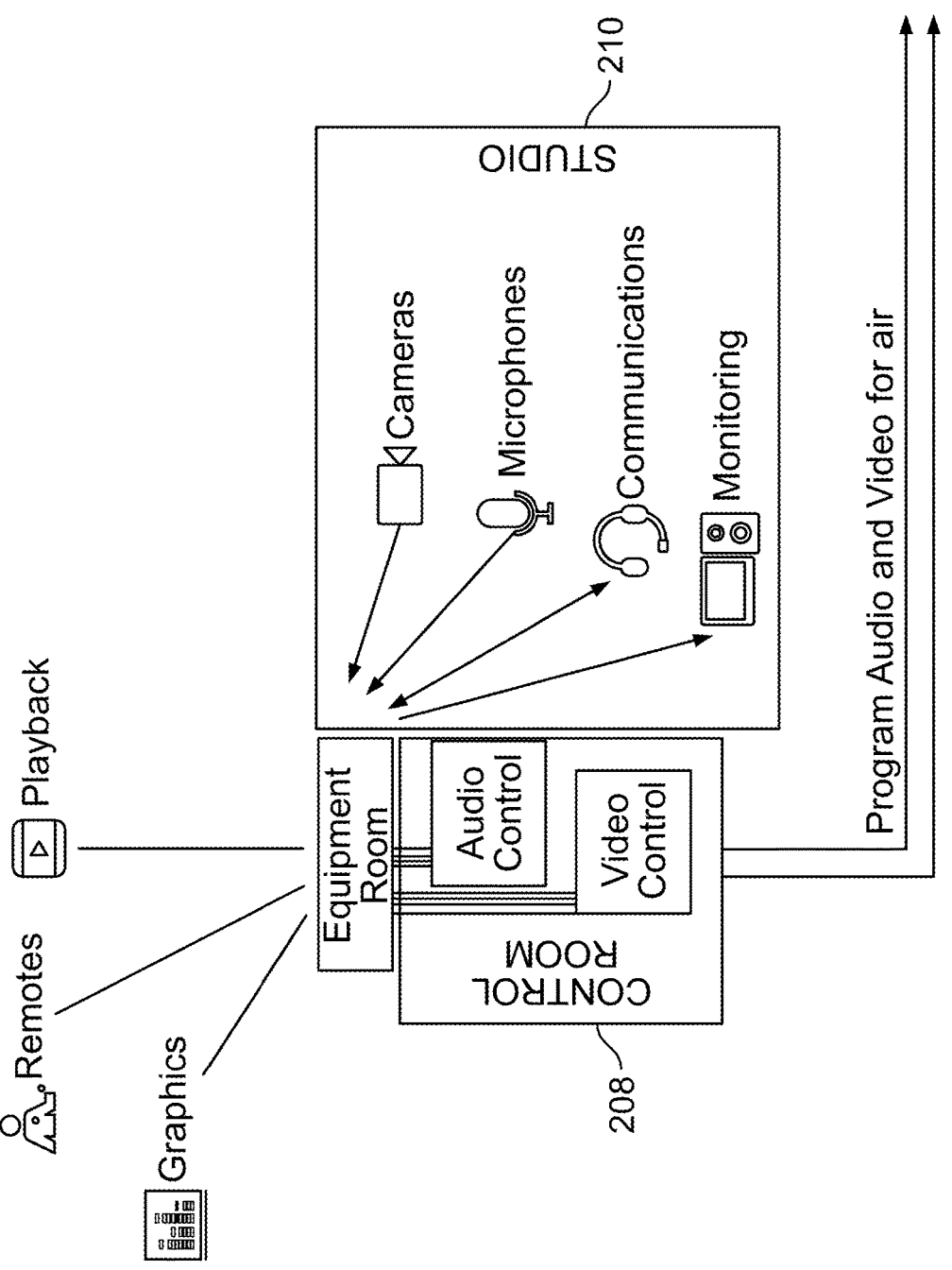
FIG. 2A illustrates an example of a control room in the environment of FIG. 1.

FIG. 2A illustrates an example of a control room 208 (e.g., Control Room W or Control Room Y) in the environment of FIG. 1. It is understood that the control room 208 may include one or more physical production control rooms and/or one or more virtual production control rooms. In at least one aspect, if a virtual production control room(s) is included, a PROM would communicate with a router configured to interface with the virtual production control room(s).

With reference to FIG. 2A, the control room 208 may receive inputs from multiple sources. For example, the control room 208 may receive inputs from remote entities or external sources. The inputs may include external graphics and external playback.

In addition, the control room 208 may receive inputs from a studio 210 (e.g., an in-house studio). The inputs may be generated by cameras and/or microphones located at the studio 210. There may be two-way communications between the control room 208 and the studio 210. In addition, the control room 208 may provide output to the studio 210 (e.g., audiovisual output for purposes of monitoring).

Based on the inputs that it receives, the control room 208 produces output audio and/or video signals that are suitable for broadcast (e.g., over-the-air broadcast).

Figure 2B:
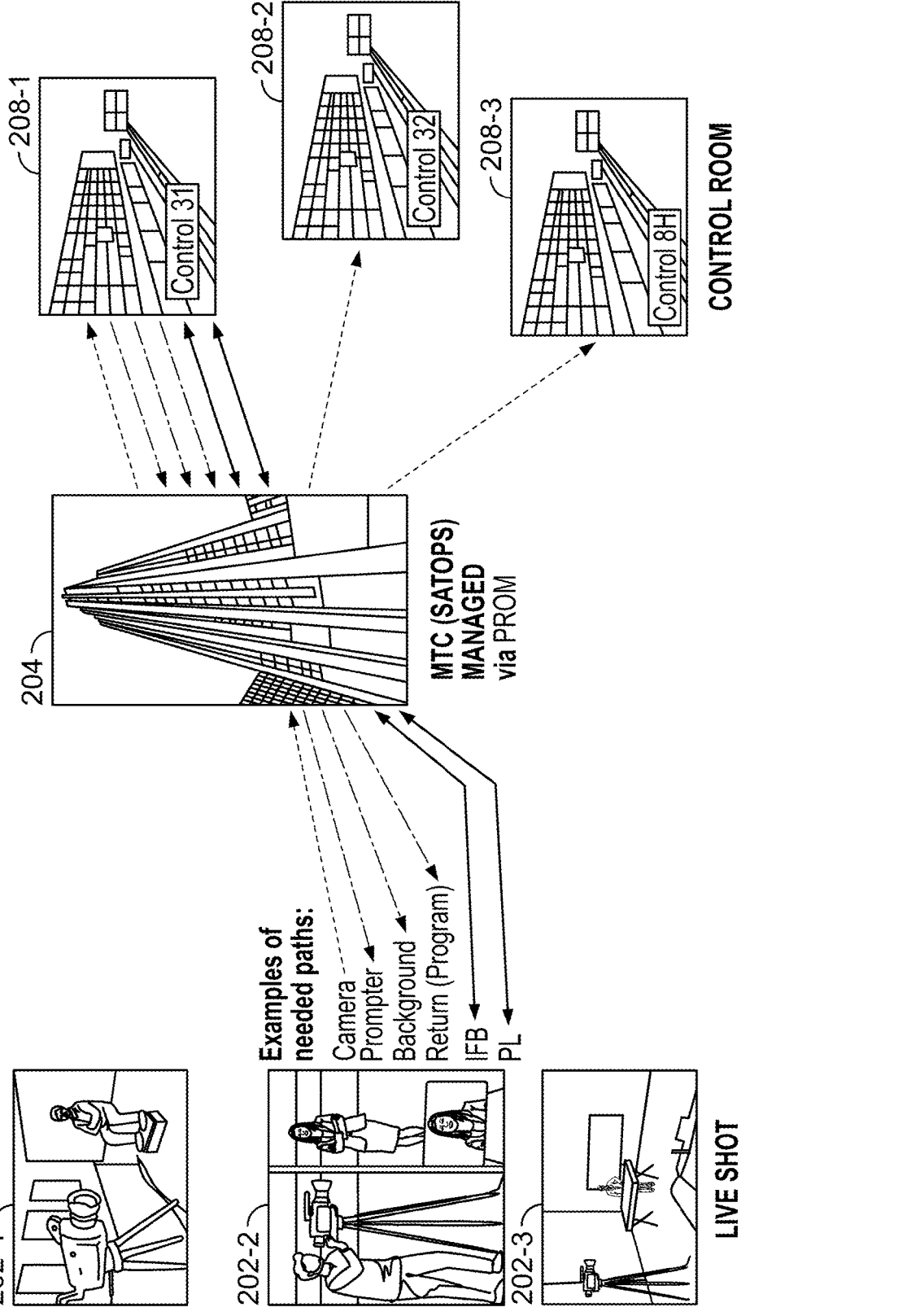
FIG. 2B is a diagram of an example environment in which live (or live-to-tape) media content is produced according to at least one embodiment.

FIG. 2B is a diagram of an example environment in which live (or live-to-tape) media content is produced according to at least one embodiment.

With reference to FIG. 2B, each of live shots 202-1, 202-2, 202-3 may produce content that is to be used by any of control rooms 208-1, 208-2, 208-3.

Each of the control rooms 208-1, 208-2, 208-3 may be similar to the control room 208 described earlier with reference to FIG. 2B. Each of live shots 202-1, 202-2, 202-3 may produce content similar to that described earlier with reference to live shot 102 of FIG. 1. In an aspect, the live shots 202-1, 202-2, 202-3 may correspond to a remote location, a studio, or another control room.

PROM 204 may be similar to the PROM 104 described earlier with reference to FIG. 1. The PROM 204 may serve as an intermediary between the live shots 202-1, 202-2, 202-3 and the control rooms 208-1, 208-2, 208-3. By way of example, the PROM 204 may serve to facilitate connectivity between a given live shot and a given control room.

With reference to FIG. 2B, a camera at a given live shot provides inputs to the PROM 204. This may enable a camera operator and technicians at the remote location to communicate with one or more individuals (e.g., a director) at the control room.

Concurrently, the PROM 204 may provide outputs that may be used by one or more individuals (e.g., a correspondence reporter) located at a location of the live shot. For example, such outputs may enable a remote media correspondent at the location of the live shot to be able to hear the program or show that is in production. In addition, the remote media correspondent may be able to see the program or show. The outputs may also include teleprompter output that may be read by the remote media correspondent.

A given live shot may interact with multiple control rooms over the span of one day. For example, the remote media correspondent may be scheduled to appear on a first program at a given time, and also to appear later on a second program different from the first program, where the first program and the second program are produced by different respective control rooms.

Aspects of this disclosure are directed to improving setup and transferability of live shots such as those that are described herein.

Figure 3:
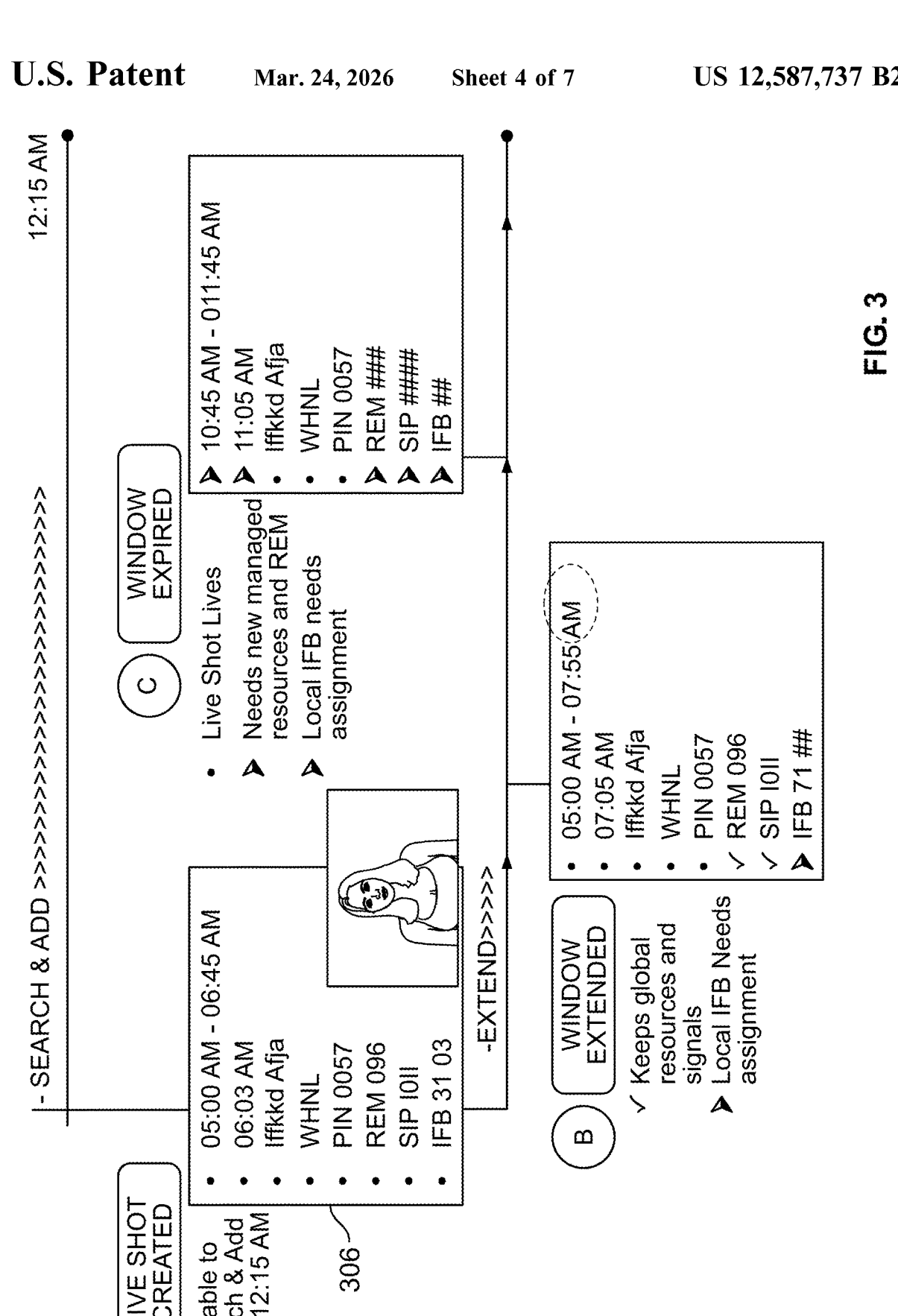
FIG. 3 illustrates processing of a live shot profile according to at least one embodiment.

FIG. 3 illustrates processing of an object profile 306 according to at least one embodiment. The object profile 306 may be similar to the object profile 106 described earlier with reference to FIG. 1.

With respect to searching, once a profile is created, the profile may be considered active for the duration of a defined period (e.g., life cycle). For example, with reference to FIG. 3 (see, e.g., creation of live shot at Time A), the object profile 306 may be considered active for the duration of a defined period that extends to 12:15 AM of the following day. As such, during the defined period, the object profile 306 may be searchable by an operator. For example, the object profile 306 may be searchable by entering one or more parameters including a location, venue, host, etc. In one example, an operator in a given control room may search for the corresponding live shot within the PROM. Accordingly, the PROM may access the object profile 306.

For example, when accessing the object profile 306, information (e.g., a start time and/or an end time) included in the profile may be changed by an operator with appropriate permissions. With reference to FIG. 3 (see, e.g., creation of live shot at Time A), the start time and the end time included in the object profile 306 may initially be set to 5:00 AM and 6:45 AM, respectively. In this regard, the object profile 306 may include additional information, such as a scheduled hit time of 6:03 AM, the name of an individual (e.g., host) speaking at the location of the live shot (e.g., an individual by the name of "Iffkkd Afja"), the name of the location of the live shot (e.g., "WHLN"), etc. The identification of such information (or combinations thereof) allow an operator to search for and find the object profile 306 (and therefore the corresponding live shot).

At a time that falls within the above-noted window starting at 5:00 AM and ending at 6:45 AM, the end time may be adjusted or delayed. For example, with reference to FIG. 3 (see, e.g., extension of window at Time B), the end time is extended to 7:55 AM. As such, the usability window of the object profile 306 is extended without necessarily requiring a re-creation of a new or different object profile that would involve assignment of global programming resources.

At the extended end time of 7:55 AM, the window expires (see, e.g., expiration of window at Time C). The live shot corresponding to the object profile 306 continues to exist. However, assignment of at least some global programming resources may be relinquished. For example, with continued reference to FIG. 3, shared resources that are usable by different control rooms may be relinquished. Such shared resources may include the REM (remote source, or remote router source), the SIP (e.g., device in a server that enables transferability between control rooms), interruptible foldback (IFB) which regards landline telephone production resource(s) for remote talent to hear the program, party line (PL) which regards landline telephone production resource(s) for communication between the control room and the remote location, or any combination thereof. Because the previously defined window has already ended on or before Time C, new start and end times may be defined. For example, as illustrated in FIG. 3, new start and end times may be set to 10:45 AM and 11:45 AM, respectively. Resources may be assigned to address earlier relinquishing of shared resources.

Using a PROM (e.g., PROM 104 or 204), an operator may initiate connectivity between a given live shot and a given control room. As described earlier, the PROM may access the object profile 306. Further, the PROM may also access a profile associated with a given control room.

For example, with reference back to FIG. 2B, the operator may manually map input and output parameters (I/O) from a profile corresponding to live shot 202-1 to the I/O parameters of a profile corresponding to control room 208-1, such that the video and audio outputs from live shot 202-1 are suitably matched up with the appropriate inputs of control room 208-1. As part of this alignment processing, communication channels between live shot 202-1 and control room 208-1 may also be established.

The mapping may be performed such that mapping of inputs/outputs/subscriptions for routable resources for the control room are performed. Endpoints and resources may be mapped and shared, and entries in a PROM I/O matrix may be created to serve as a source of truth for the routed paths (inbound and outbound) between a live (or remote) shot and a control room, including the communication channels between the locations. In at least one aspect, the I/O matrix is stored at the PROM. Further, the length of time over which the I/O matrix remains stored at the PROM may be indefinite.

In at least one aspect, I/O from source to destination is performed on a one-to-one basis. For example, a video output from a live shot may be mapped directly to a video input for a control room. However, in at least one aspect, a same source may be routed to be sent to multiple destinations. For example, if the source is another control room, an output of the particular control room may be routed to multiple destinations—e.g., to facilitate transmission of a digital stream, high/low quality recording, monitoring by a quality control station, and/or back to a remote location for "return" confidence viewing. As another example, a teleprompter or graphics feed may be concurrently sent to two different control rooms that are shadowing each other.

Once the mapping between the profiles of live shot 202-1 and control room 208-1 have been completed, the results of the mapping may be reused for subsequent connections between live shot 202-1 and control room 208-1.

For example, at one point during a broadcast day, control room 208-1 may relinquish ownership or access to live shot 202-1, thereby severing the connection between live shot 202-1 and control room 208-1. Later, within the same broadcast day, an operator at control room 208-1 may decide to reestablish the connection with live shot 202-1 by selecting live shot 202-1 via the PROM.

The composite signals and communication channel inputs from live shot 202-1 are maintained within the PROM. Once selected, such features can be reused with control room 208-1 based on the mapping that was described earlier. Accordingly, the profile corresponding to live shot 202-1 can then be reused with respect to control room 208-1. In an aspect, before re-enabling the live shot 202-1 connection to the control room 208-1, the PROM may determine whether the profile corresponding to the live shot 202-1 is still active based on the start time and end time associated with the profile. If the profile is active, the PROM will enable the connection based on the previously used mapping. However, if the profile associated with the live shot 202-1 is inactive, the PROM may provide an indication to the operator that the connection cannot be performed because the profile for the live shot 202-1 is inactive. In another aspect, only profiles that are active may be displayed by the PROM and made available for mapping to a control room.

In a manner similar to that described earlier with respect to control room 208-1, an operator may initiate connectivity between the live shot 202-1 and a different control room (e.g., control room 208-2 of FIG. 2B).

According to one or more aspects, the I/O mapping may be automatically configured based on known standards. For example, each live shot (or remote source) and control room may be associated with a known standard, where each standard is associated with a predetermined set of available I/O parameters (which may or may not include communication channels). Based on the associated standards, the mapping of I/O parameters may be automated. In this example, when an operator in a given control room (e.g., control room 208-3 of FIG. 2B) searches for and selects a given live shot (e.g., live shot 202-3), an PROM may access the object profile associated with the live shot and determine whether the composition of signals associated with the live shot is compatible with a profile associated with the control room, where the profile of the control room identifies the available I/O parameters.

In an aspect, the two profiles can be associated with the same standard, in which case the mapping may be a direct mapping between preset (or even identical) I/O parameters based on the standard.

In another aspect, the two profiles may be associated with different, but still known, standards, in which case the PROM may need to determine how parameters from one standard are mapped to parameters of another standard. This mapping may be defined by a conversion template that maps one or more signals of one standard to one or more corresponding signals of a different standard. Assuming the mapping is compatible (because the standards are the same or because a conversion template between different standards is available), the PROM may route the composition of signals from the live shot to the control room. As part of the routing, the I/O signals associated with the live shot may be mapped to the corresponding I/O of the control room. On the other hand, if the profiles are not compatible, the control room may receive a message indicating the same and that the connection is not possible. The message may also indicate one or more lacking or mismatched parameters. If mapping cannot be performed automatically, the PROM may attempt to map a subset of the I/O parameters and prompt the operator to manually map a remaining subset of the I/O parameters.

In another aspect, multiple control rooms may receive signals from the same live shot. However, only one control room may "own" the live shot, while one or more other control rooms may "use" the live shot. The control room that uses the live shot may receive audio and video signals from the live shot. The control room that owns the live shot receives the audio and video signals from the live shot and has sole control over the communication channels and/or feeds sent to the live shot location such as graphics for a set monitor, teleprompter and program video associated with the live shot. For example, the communication channels may include access to the earpiece of the talent appearing on the live shot or access to communication links associated with personnel directing the live shot. As another example, a teleprompter feed may be sent from the control room that "owns" the live shot to the originating location. For each live shot, the PROM may identify and monitor the "owning" control room and/or the "using" control room along with their access to control room resources. The PROM will also allow the "owning" control room to relinquish ownership to another control room or to leave the ownership unassigned. For example, referring to FIG. 2B, if the control room 208-2 is the "using" control room of the live shot 202-2, and the "owning" control room is unassigned, the control room 208-3 may ask to be associated with the live shot 202-2 as the "owning" control room even though the control room 208-2 was using the control room before the control room 208-3.

As described with reference to various embodiments, a system (e.g., PROM 104 of FIG. 1) may be utilized to coordinate various disparate technical and production workflows in order to configure and manage elements for on-air productions. The system may consolidate several workflows and aspects of on-air production via an application interface. The interface may cover several distinct processes—production planning and programming, hardware and signal configuration, and live user interaction to trigger on-air systems.

The system may combine the various workflows to produce a consolidated, universal output (e.g., object profile 106) that simplifies and normalizes the management of live shots across various production facilities. Accordingly, the system may serve to improve efficiency and versatility with respect to creating live shots (or live shot profiles), switching between different live shots, and/or moving live shots from one control room to another.

FIG. 4 illustrates a flowchart of a method 400 for providing connectivity between a remote source and a control room according to at least one embodiment.

In at least one aspect, at block 402, a selectable list of profiles available for a control room connection may be provided. Each profile of the selectable list of profiles is active and is associated with a corresponding remote source. For example, with reference back to FIG. 2B, each profile may be associated with a corresponding live shot 202-1, 202-2, 202-3.

At block 404, a request to connect the remote source and the control room is received.

For example, with reference back to FIG. 2B, a request to connect a particular live shot (e.g., live shot 202-1) and a particular control room (e.g., control room 208-1) may be received.

At block 406, in response to receiving the request, an input/output mapping between the remote source and the control room is determined.

For example, with reference back to FIG. 1, an object profile 106 may be determined to represent the live shot as a composition of signals and/or resources (e.g., source and destination audio/video (A/V) signals/resources such as communications settings, switcher settings, audio board input/output (I/O) settings, etc.).

The input/output mapping is based on a first profile information associated with the remote source and a second profile information associated with the control room.

In at least one aspect, determining the input/output mapping may include: receiving the input/output mapping between the remote source (e.g., live shot 202-1) and the control room (e.g., control room 208-1); and storing the input/output mapping for subsequent retrieval thereof.

In at least one aspect, determining the input/output mapping may include generating the input/output mapping based on the first profile information associated with the remote source (e.g., live shot 202-1) and the second profile information associated with the control room (e.g., control room 208-1).

In at least one further aspect, the first profile information corresponding to the remote source (e.g., live shot 202-1) and the second profile information corresponding to the control room (e.g., control room 208-1) may conform with a same input/output mapping standard. The generated input/output mapping is based on the same input/output mapping standard.

In at least one further aspect, the first profile information corresponding to the remote source may be associated with a first input/output mapping standard, and the second profile information corresponding to the control room may be associated with a second input/output mapping standard. Generating input/output mapping may include determining an intermediate input/output mapping between the first input/output mapping standard to the second input/output mapping standard. The generated input/output mapping between the remote source and the control room is based on the determined intermediate mapping.

At block 408, based on the determined input/output mapping, a connection between the remote source and the control room is enabled.

For example, with reference back to FIG. 2B, a connection between the remote source (e.g., live shot 202-1) and the control room (e.g., control room 208-1) is enabled.

In at least one aspect, the remote source may include a camera (e.g., a camera corresponding to live shot 202-1) configured to provide live audiovisual content to the control room for production of a live broadcast.

In at least one aspect, enabling the connection may include assigning, to the control room, sole control of one or more communication channels supporting the providing of the live audiovisual content.

For example, with reference back to FIG. 2B, the control room (e.g., control room 208-1) may be assigned sole control of one or more communication channels supporting the providing of the live audiovisual content (e.g., from live shot 202-1).

In at least one further aspect, at block 410, a request to relinquish the sole control of the one or more communication channels may be received. For example, a request to relinquish the sole control of one or more communication channels supporting the providing of the live audiovisual content (e.g., from live shot 202-1) may be received.

In at least one further aspect, at block 412, a request from a second control room to connect to the remote source may be received. For example, with reference back to FIG. 2B, a request from a second control room (e.g., control room 208-2) to connect to the remote source (e.g., live shot 202-1) may be received.

Accordingly, at block 414, the second control room (e.g., control room 208-2) may be designated as a using control room.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 5:
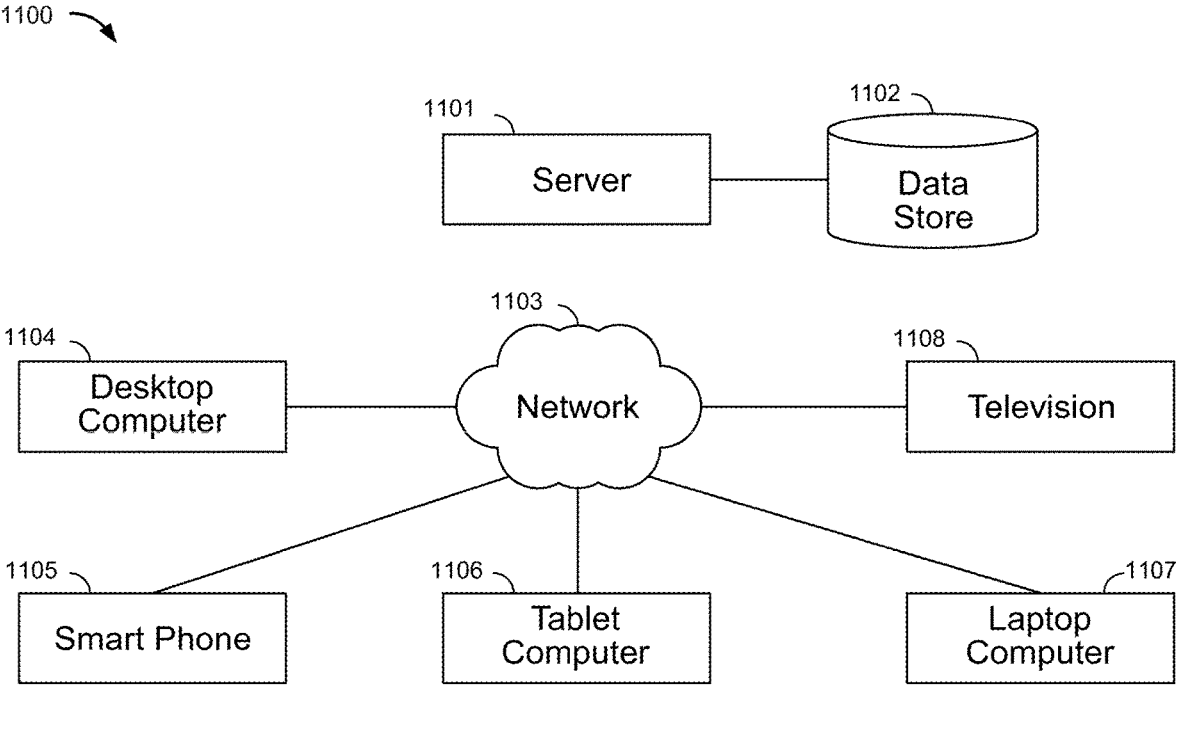
FIG. 5 is an illustration of a computing environment according to at least one embodiment.

In selected embodiments, features and aspects described herein may be implemented within a computing environment 1100, as shown in FIG. 5, which may include one or more computer servers 1101. The server 1101 may be operatively coupled to one or more data stores 1102 (for example, databases, indexes, files, or other data structures). The server 1101 may connect to a data communication network 1103 including a local area network (LAN), a wide area network (WAN) (for example, the Internet), a telephone network, a satellite or wireless communication network, or some combination of these or similar networks.

One or more client devices 1104, 1105, 1106, 1107, 1108 may be in communication with the server 1101, and a corresponding data store 1102 via the data communication network 1103. Such client devices 1104, 1105, 1106, 1107, 1108 may include, for example, one or more laptop computers 1107, desktop computers 1104, smartphones and mobile phones 1105, tablet computers 1106, televisions 1108, or combinations thereof. In operation, such client devices 1104, 1105, 1106, 1107, 1108 may send and receive data or instructions to or from the server 1101 in response to user input received from user input devices or other input. In response, the server 1101 may serve data from the data store 1102, alter data within the data store 1102, add data to the data store 1102, or the like, or combinations thereof.

In selected embodiments, the server 1101 may transmit one or more media files including audio and/or video content, encoded data, generated data, and/or metadata from the data store 1102 to one or more of the client devices 1104, 1105, 1106, 1107, 1108 via the data communication network 1103. The devices may output the audio and/or video content from the media file using a display screen, projector, or other display output device. In certain embodiments, the environment 1100 configured in accordance with features and aspects described herein may be configured to operate within or support a cloud computing environment. For example, a portion of, or all of, the data store 1102 and server 1101 may reside in a cloud server.

Figure 6:
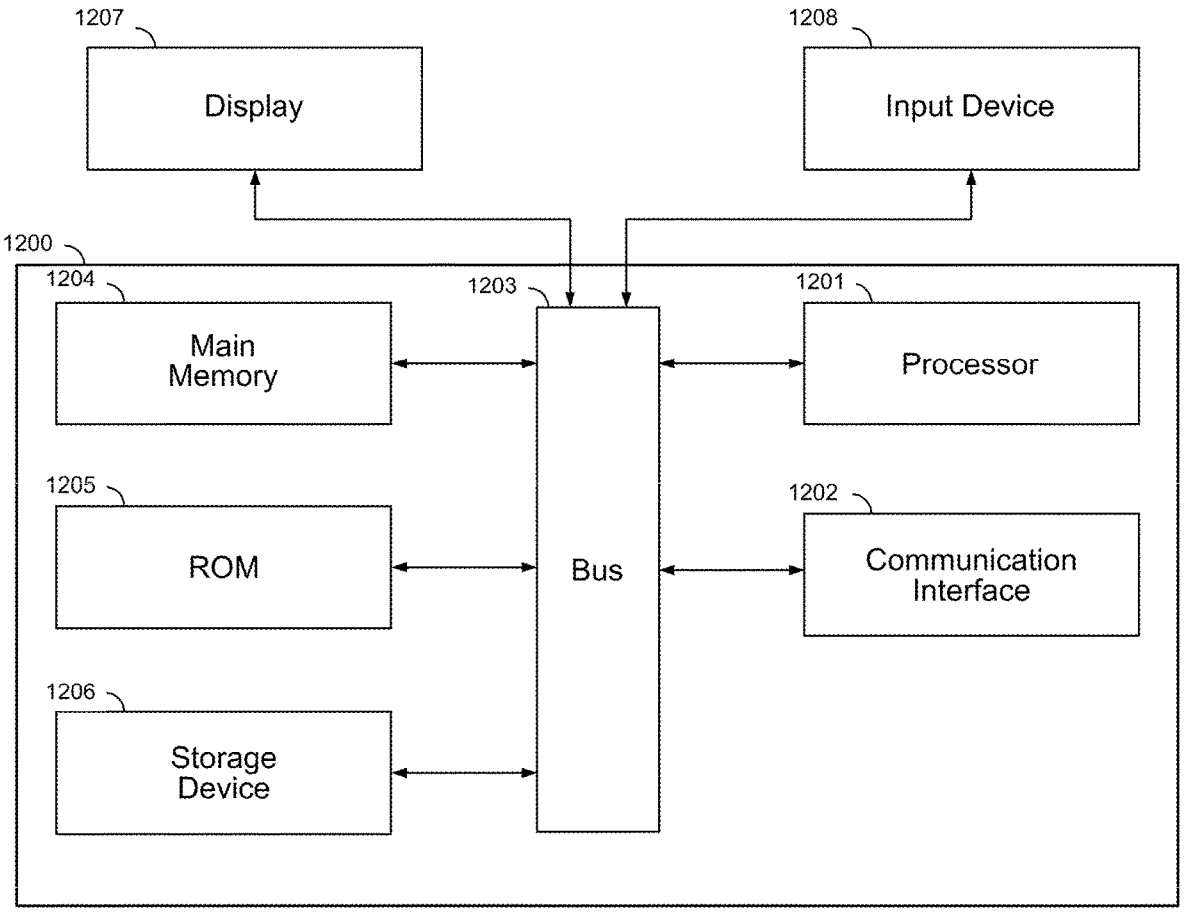
FIG. 6 is a block diagram of a device according to at least one embodiment.

With reference to FIG. 6, an illustration of an example computer 1200 is provided. One or more of the devices 1104, 1105, 1106, 1107, 1108 of the environment 1100 may be configured as or include such a computer 1200.

In selected embodiments, the computer 1200 may include a bus 1203 (or multiple buses) or other communication mechanism, a processor 1201, main memory 1204, read only memory (ROM) 1205, one or more additional storage devices 1206, and/or a communication interface 1202, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 1203 or other communication mechanism, including multiple such buses or mechanisms, may support communication of information within the computer 1200. The processor 1201 may be connected to the bus 1203 and process information. In selected embodiments, the processor 1201 may be a specialized or dedicated microprocessor configured to perform particular tasks in accordance with the features and aspects described herein by executing machine-readable software code defining the particular tasks. Main memory 1204 (for example, random access memory—or RAM—or other dynamic storage device) may be connected to the bus 1203 and store information and instructions to be executed by the processor 1201. Main memory 1204 may also store temporary variables or other intermediate information during execution of such instructions.

ROM 1205 or some other static storage device may be connected to a bus 1203 and store static information and instructions for the processor 1201. The additional storage device 1206 (for example, a magnetic disk, optical disk, memory card, or the like) may be connected to the bus 1203. The main memory 1204, ROM 1205, and the additional storage device 1206 may include a non-transitory computer-readable medium holding information, instructions, or some combination thereof—for example, instructions that, when executed by the processor 1201, cause the computer 1200 to perform one or more operations of a method as described herein. The communication interface 1202 may also be connected to the bus 1203. A communication interface 1202 may provide or support two-way data communication between the computer 1200 and one or more external devices (for example, other devices contained within the computing environment).

In selected embodiments, the computer 1200 may be connected (for example, via the bus 1203) to a display 1207. The display 1207 may use any suitable mechanism to communicate information to a user of a computer 1200. For example, the display 1207 may include or utilize a liquid crystal display (LCD), light emitting diode (LED) display, projector, or other display device to present information to a user of the computer 1200 in a visual display. One or more input devices 1208 (for example, an alphanumeric keyboard, mouse, microphone) may be connected to the bus 1203 to communicate information and commands to the computer 1200. In selected embodiments, one input device 1208 may provide or support control over the positioning of a cursor to allow for selection and execution of various objects, files, programs, and the like provided by the computer 1200 and displayed by the display 1207.

The computer 1200 may be used to transmit, receive, decode, display, etc. one or more video files. In selected embodiments, such transmitting, receiving, decoding, and displaying may be in response to the processor 1201 executing one or more sequences of one or more instructions contained in main memory 1204. Such instructions may be read into main memory 1204 from another non-transitory computer-readable medium (for example, a storage device).

Execution of sequences of instructions contained in main memory 1204 may cause the processor 1201 to perform one or more of the procedures or steps described herein. In selected embodiments, one or more processors in a multi-processing arrangement may also be employed to execute sequences of instructions contained in main memory 1204. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 1201, or that stores data for processing by a computer, and include all computer-readable media, with the sole exception being a transitory, propagating signal. Such a non-transitory computer readable medium may include, but is not limited to, non-volatile media, volatile media, and temporary storage media (for example, cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 1202 may provide or support external, two-way data communication to or via a network link. For example, the communication interface 1202 may be a wireless network interface controller or a cellular radio providing a data communication network connection. Alternatively, the communication interface 1202 may include a LAN card providing a data communication connection to a compatible LAN. In any such embodiment, the communication interface 1202 may send and receive electrical, electromagnetic, or optical signals conveying information.

A network link may provide data communication through one or more networks to other data devices (for example, client devices as shown in the computing environment 1100). For example, a network link may provide a connection through a local network of a host computer or to data equipment operated by an Internet Service Provider (ISP). An ISP may, in turn, provide data communication services through the Internet. Accordingly, a computer 1200 may send and receive commands, data, or combinations thereof, including program code, through one or more networks, a network link, and communication interface 1202. Thus, the computer 1200 may interface or otherwise communicate with a remote server (for example, server 1101), or some combination thereof.

The various devices, modules, terminals, and the like described herein may be implemented on a computer by execution of software including machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for providing connectivity between a remote source and a control room, the method comprising:

receiving a request to connect the remote source and the control room;

in response to receiving the request, determining an input/output mapping between the remote source and the control room, wherein the input/output mapping is based on a first profile information associated with the remote source and a second profile information associated with the control room; and based on the determined input/output mapping, enabling a connection between the remote source and the control room, wherein the remote source comprises a camera configured to provide live audiovisual content to the control room for production of a live broadcast, and wherein enabling the connection comprises assigning, to the control room, sole control of one or more communication channels supporting the providing of the live audiovisual content.

2. The method of claim 1, wherein determining the input/output mapping comprises:

receiving the input/output mapping between the remote source and the control room; and storing the input/output mapping for subsequent retrieval thereof.

3. The method of claim 1, wherein determining the input/output mapping comprises generating the input/output mapping based on the first profile information associated with the remote source and the second profile information associated with the control room.

4. The method of claim 3, wherein the first profile information corresponding to the remote source and the second profile information corresponding to the control room conform with a same input/output mapping standard, and wherein the generated input/output mapping is based on the same input/output mapping standard.

5. The method of claim 3, wherein the first profile information corresponding to the remote source is associated with a first input/output mapping standard, and the second profile information corresponding to the control room is associated with a second input/output mapping standard, and wherein generating input/output mapping comprises:

determining an intermediate input/output mapping between the first input/output mapping standard to the second input/output mapping standard, wherein the generated input/output mapping between the remote source and the control room is based on the determined intermediate mapping.

6. The method of claim 1, further comprising:

receiving a request to relinquish the sole control of the one or more communication channels.

7. The method of claim 1, further comprising:

receiving a request from a second control room to connect to the remote source; and designating the second control room as a using control room.

8. The method of claim 1, further comprising:

providing a selectable list of profiles available for a control room connection, wherein each profile of the selectable list of profiles is active and is associated with a corresponding remote source, and wherein the first profile information is received based on the selectable list of profiles.

9. A machine-readable non-transitory medium having stored thereon machine-executable code for providing connectivity between a remote source and a control room, comprising code to:

receive a request to connect the remote source and the control room;

in response to receiving the request, determine an input/output mapping between the remote source and the control room, wherein the input/output mapping is based on a first profile information associated with the remote source and a second profile information associated with the control room; and based on the determined input/output mapping, enable a connection between the remote source and the control room, wherein the remote source comprises a camera configured to provide live audiovisual content to the control room for production of a live broadcast, and wherein code to enable the connection comprises code to assign, to the control room, sole control of one or more communication channels supporting the providing of the live audiovisual content.

10. The machine-readable non-transitory medium of claim 9, wherein code to determine the input/output mapping comprises code to:

receive the input/output mapping between the remote source and the control room; and store the input/output mapping for subsequent retrieval thereof.

11. The machine-readable non-transitory medium of claim 9, wherein code to determine the input/output mapping comprises code to generate the input/output mapping based on the first profile information associated with the remote source and the second profile information associated with the control room.

12. The machine-readable non-transitory medium of claim 11, wherein the first profile information corresponding to the remote source and the second profile information corresponding to the control room conform with a same input/output mapping standard, and wherein the generated input/output mapping is based on the same input/output mapping standard.

13. The machine-readable non-transitory medium of claim 11, wherein the first profile information corresponding to the remote source is associated with a first input/output mapping standard, and the second profile information corresponding to the control room is associated with a second input/output mapping standard, and wherein code to generate the input/output mapping comprises code to:

determine an intermediate input/output mapping between the first input/output mapping standard to the second input/output mapping standard, wherein the generated input/output mapping between the remote source and the control room is based on the determined intermediate mapping.

14. The machine-readable non-transitory medium of claim 9, wherein the code is further to:

receive a request to relinquish the sole control of the one or more communication channels.

15. The machine-readable non-transitory medium of claim 9, wherein the code is further to:

receive a request from a second control room to connect to the remote source; and designate the second control room as a using control room.

16. An apparatus for providing connectivity between a remote source and a control room, the apparatus comprising:

a network communication unit configured to transmit and receive data; and one or more processors configured to:

receive a request to connect the remote source and the control room;

in response to receiving the request, determine an input/output mapping between the remote source and the control room, wherein the input/output mapping is based on a first profile information associated with the remote source and a second profile information associated with the control room; and based on the determined input/output mapping, enable a connection between the remote source and the control room, wherein the remote source comprises a camera configured to provide live audiovisual content to the control room for production of a live broadcast, and wherein the one or more processors are further configured to enable the connection by assigning, to the control room, sole control of one or more communication channels supporting the providing of the live audiovisual content.

\* \* \* \* \*